UNITED STATES PATENT OFFICE.

ARTHUR L. GRANT AND CHARLES GORDON RICHARDSON, OF TORONTO, CANADA; SAID GRANT ASSIGNOR TO CHARLES RIORDON, OF SAME PLACE, AND JOHN ROAF BARBER, OF GEORGETOWN, CANADA.

PROCESS OF REFINING NICKEL AND COPPER MATTES.

SPECIFICATION forming part of Letters Patent No. 538,212, dated April 23, 1895.

Application filed September 4, 1894. Serial No. 535,732. (No specimens.)

*To all whom it may concern:*

Be it known that we, ARTHUR LAW GRANT and CHARLES GORDON RICHARDSON, chemists, of the city of Toronto, in the county of York, Province of Ontario, Canada, have invented certain new and useful Improvements in Processes of Refining Nickel and Copper Mattes, of which the following is a specification.

The object of our invention is to devise a cheap and effective process of separating metallic nickel from nickel and copper mattes and it consists essentially, first, in reducing the nickel and copper mattes to a mixture of finely divided nickel and copper; second, in treating the mixed metals with an acid, preferably sulphuric; third, in precipitating any copper taken up by the acid by adding to the solution a further small quantity of the mixed metals, and, fourth, in reducing the solution of nickel sulphate obtained in the last two operations of the process in any ordinary manner. This process is especially applicable to those mattes which contain either no iron or but a small percentage thereof.

In the first place the matte (which may contain nickel, copper, iron and cobalt), is crushed to a moderate degree of fineness and then [roasted to complete oxidation in a reverberatory or other suitable furnace. The resulting mixed oxides are then placed in a suitable receptacle provided with means whereby the contents may be properly stirred or agitated and there subjected to the action of heat and a suitable reducing gas such as hydrogen, carbon mon-oxide, natural gas or water gas, until complete reduction of the metallic oxides has taken place. It is important that this reduction be made, because it helps the process in the subsequent treatment with sulphuric acid hereinafter described. The sulphuric acid will fail to act upon a coarse mixture of oxides or a coarse mixture of the metals, so as to obtain a separation of the same, but if the oxides are reduced to a finely-divided mixture of the metals, the action is immediate and very rapid; whereas in the former case the action is exceedingly slow and stops after a certain period, owing to the accumulation of undissolved copper on the surface of the lumps. If much iron is present in the matte it is considered preferable to increase the temperature toward the close of the operation of reduction in order that the resulting metals may not be too strongly pyrophoric. At this stage of the process the matte has been reduced to a finely divided mixture of nickel and copper and a small quantity of iron, if any were present in the matte under treatment. This finely divided mixture is then removed to a suitable tank and there subjected to the action of an acid, preferably diluted sulphuric. By the action of this acid the iron and nickel pass into solution as sulphates, while in the presence of the nickel scarcely any of the copper is attacked. In this operation by keeping the reduced metals in excess with respect to the acid, a solution may be obtained quite free from copper sulphate, but in practice we prefer to use such a quantity of acid as will just combine with the iron and nickel contained in the mixture of metals acted upon. In this case it is generally found that a small proportion of copper sulphate is present in the resulting solution. To precipitate this, the solution of nickel and copper sulphates is placed in another tank and there acted upon by a fresh portion of the finely divided metals in order to neutralize any free acid and completely precipitate all traces of copper therein. The solution is then carefully filtered or decanted from the slimes in the tank and subjected to the action of the chlorine gas or atmospheric air by passing streams of the same through the solution, in order to peroxidize the iron and cobalt, if the latter be present. The iron or iron and cobalt may then be precipitated by any of the usual and well known methods. The remaining solution of nickel sulphate may then be used for the preparation of any of the nickel salts or the nickel may be precipitated as nickel hydroxide by the use of potash and then converted into the oxide or metal. We prefer, however, to allow the hot solution to cool and the larger proportion of the nickel sulphate to crystallize out and to use the mother liquor to dilute fresh portions of the acid. The nickel sulphate so obtained is then roasted to oxide in a reverberatory furnace and the oxide reduced, if so desired, by any of the usual methods to metallic nickel.

What we claim as our invention is—

1. The above described process of refining nickel and copper mattes which consists essentially in first converting the matte into a finely divided mixture of metallic nickel and copper and then subjecting the mixture to the action of sulphuric acid, substantially as and for the purpose specified.

2. The above described process of refining nickel and copper mattes which consists essentially in first converting the matte into a finely divided mixture of metallic nickel and copper, then in subjecting the mixture to the action of a sufficient quantity of sulphuric acid to combine with the whole of the nickel, and then in treating the solution with a further portion of the mixed metals to precipitate any traces of copper sulphate, leaving nickel sulphate in solution substantially as and for the purpose specified.

3. The above described process of refining nickel and copper mattes which consists essentially in first oxidizing the matte, then in reducing it to a finely divided mixture of nickel and copper by heating it in the presence of a suitable reducing gas, such as hydrogen or carbon monoxide, and then in subjecting the mixture to the action of sulphuric acid substantially as and for the purpose specified.

4. The above described process of refining nickel and copper mattes which consists essentially in first oxidizing the matte, then in reducing it to a finely divided mixture of nickel and copper by heating it in the presence of a suitable reducing gas, such as hydrogen or carbon monoxide, then in subjecting the mixture to the action of a sufficient quantity of sulphuric acid to combine with the whole of the nickel and then in treating the solution with a further portion of the mixed metals to precipitate any traces of copper sulphate, leaving nickel sulphate in solution substantially as and for the purpose specified.

5. The above described process of refining nickel and copper mattes which consists essentially in first oxidizing the matte, then in reducing it to a finely divided mixture of nickel and copper by heating it in the presence of a suitable reducing gas, such as hydrogen or carbon monoxide, then in subjecting the mixture to the action of a sufficient quantity of sulphuric acid to combine with the whole of the nickel and then in treating the solution with a further portion of the mixed metals to precipitate any traces of copper sulphate, leaving nickel sulphate in solution, then decanting the solution from the resulting slimes, subjecting the same to the action of an oxidizing agent, such as chlorine gas or atmospheric air to peroxidize the iron and cobalt, if any be present, then precipitating the latter by any of the usual methods, and treating the remaining nickel solution to reduce the nickel therein to the desired form, such as nickel salts or metallic nickle, substantially as and for the purpose specified.

Toronto, August 27, 1894.

ARTHUR L. GRANT.
C. GORDON RICHARDSON.

In presence of—
  E. A. FOSTER,
  A. S. RICHARDSON.